(12) United States Patent
Bourne (10) Patent No.: US 11,913,678 B2
(45) Date of Patent: Feb. 27, 2024

(54) GROUND HEAT-EXCHANGE SYSTEM WITH WATER-FILLED BOREHOLES

(71) Applicant: Richard Curtis Bourne, Davis, CA (US)

(72) Inventor: Richard Curtis Bourne, Davis, CA (US)

( * ) Notice: Subject to any disclaimer, the term of this patent is extended or adjusted under 35 U.S.C. 154(b) by 0 days.

(21) Appl. No.: 17/714,813

(22) Filed: Apr. 6, 2022

(65) Prior Publication Data
US 2023/0073199 A1 Mar. 9, 2023

Related U.S. Application Data

(60) Provisional application No. 63/360,070, filed on Sep. 3, 2021.

(51) Int. Cl.
| | | |
|---|---|---|
| *F24T 10/10* | (2018.01) | |
| *F28D 15/00* | (2006.01) | |
| *F24T 10/00* | (2018.01) | |

(52) U.S. Cl.
CPC .............. *F24T 10/10* (2018.05); *F28D 15/00* (2013.01); *F24T 2010/56* (2018.05)

(58) Field of Classification Search
CPC ....... F24T 10/10; F24T 10/20; F24T 2010/56; F28D 15/00
See application file for complete search history.

(56) References Cited

U.S. PATENT DOCUMENTS

| | | | | |
|---|---|---|---|---|
| 3,952,802 A | * | 4/1976 | Terry ...................... | F28F 13/08 166/57 |
| 4,224,805 A | * | 9/1980 | Rothwell ................ | F24T 10/30 165/45 |
| 4,290,266 A | * | 9/1981 | Twite ....................... | F03G 7/04 165/45 |
| 4,375,831 A | * | 3/1983 | Downing, Jr. .......... | F25B 13/00 62/238.7 |
| 4,489,568 A | * | 12/1984 | Shapess .................. | F25B 13/00 165/45 |
| 4,566,532 A | * | 1/1986 | Basmajian .............. | F24T 10/30 165/45 |

(Continued)

FOREIGN PATENT DOCUMENTS

EP 1992886 A2 11/2008

*Primary Examiner* — Jianying C Atkisson
*Assistant Examiner* — Raheena R Malik
(74) *Attorney, Agent, or Firm* — Mark Protsik; Thomas Schneck (57) ABSTRACT

An economical ground heat exchanger system uses water-filled membrane liners in cylindrical augured holes. A submersible pump in a drain reservoir is shared by multiple boreholes. Thermal connection with a building or industrial process occurs through a heat exchanger thermally coupled to the reservoir. The pump sends water tempered by the heat exchanger to the water-filled holes, where it exchanges heat with the ground before overflowing through gravity drain piping back to the reservoir for continued recirculation. Heat transfer with the ground occurs through thermal contact between the water, the membrane liners, and earth supporting the liners. Optional raised borehole support rims maintain an "above grade" water level and allow removed soil to be re-used as a berm or planter over manifold pipes that connect the system components, thus eliminating the cost of trenching for the manifold pipes.

9 Claims, 4 Drawing Sheets

(56) References Cited

U.S. PATENT DOCUMENTS

| | | | | |
|---|---|---|---|---|
| 4,858,679 A | * | 8/1989 | Sakaya | F28F 1/08 |
| | | | | 165/45 |
| 4,993,483 A | * | 2/1991 | Harris | F24T 10/15 |
| | | | | 165/104.31 |
| 5,244,037 A | * | 9/1993 | Warnke | F24T 10/10 |
| | | | | 237/66 |
| 5,383,337 A | * | 1/1995 | Baker | F24F 5/0017 |
| | | | | 165/45 |
| 5,477,914 A | * | 12/1995 | Rawlings | F24T 10/30 |
| | | | | 165/45 |
| 5,560,220 A | * | 10/1996 | Cochran | F24T 10/15 |
| | | | | 165/45 |
| 5,590,715 A | * | 1/1997 | Amerman | F25B 30/06 |
| | | | | 166/57 |
| 5,687,578 A | * | 11/1997 | Cochran | F25B 41/315 |
| | | | | 62/509 |
| 5,771,700 A | * | 6/1998 | Cochran | F25B 30/06 |
| | | | | 62/197 |
| 5,816,314 A | | 10/1998 | Wiggs et al. | |
| 6,138,744 A | * | 10/2000 | Coffee | F24T 10/10 |
| | | | | 165/45 |
| 6,212,896 B1 | | 4/2001 | Genung | |
| 6,615,601 B1 | * | 9/2003 | Wiggs | F25B 27/005 |
| | | | | 62/235.1 |
| 7,191,604 B1 | * | 3/2007 | Wiggs | F24F 3/14 |
| | | | | 62/89 |
| 9,157,666 B2 | | 10/2015 | Freitag et al. | |
| 10,203,162 B2 | * | 2/2019 | Yokomine | F28D 7/106 |
| 10,962,261 B1 | * | 3/2021 | Hill | F24T 10/15 |
| 2010/0326623 A1 | * | 12/2010 | Azzam | F24T 10/15 |
| | | | | 165/45 |
| 2021/0164708 A1 | * | 6/2021 | Niemi | F24D 18/00 |
| 2022/0018555 A1 | * | 1/2022 | Cho | F24T 10/20 |

* cited by examiner

GROUND HEAT-EXCHANGE SYSTEM WITH WATER-FILLED BOREHOLES

CROSS-REFERENCE TO RELATED APPLICATION

This application claims priority under 35 U.S.C. 119(e) from U.S. provisional application 63/360,070, filed Sep. 3, 2021.

TECHNICAL FIELD

The present invention relates to ground heat exchangers for use in heating and cooling of buildings or industrial processes. Such heat exchangers typically include closed-loop heat pumps that reversibly transfer heat to and/or from the ground.

BACKGROUND ART

Typical ground heat exchange installations use 6" to 8" (15 to 20 cm) diameter, 100-to-200-foot (30 to 60 m) deep bores with polymeric U-tubes (typically of high-density polyethylene, HDPE) grouted in place to maximize heat transfer. These installations are relatively expensive and have the performance liability of allowing a relatively short heat transfer path from the downward supply tube to the upward return tube. Thus, in heat extraction mode, for example, warmer water returning from the bottom is re-cooled by water flowing downward a few inches away. A better thermal solution for in-ground tubing applications is a shallower-bore, larger diameter, vertical, spiral heat exchanger with a straight supply or return near the center of the spiral. Excavation per length of heat exchanger tubing is typically much lower for shallow-bore spirals, using augur equipment often used for power pole excavation. These shallower bores are typically less than 30' (9 m) deep, thus limiting the dangers of surface contaminants penetrating downward into deeper water supply layers.

Spiral ground exchangers were pioneered in the U.S. beginning in the 1990s, typically with installations of spirals 18" to 36" (45 to 90 cm) in diameter and 20' to 35' (6.0 to 10.5 m) deep. The first of these used HDPE tubing pre-wired to cylindrical reinforcing steel cages. Beginning in 1997, this inventor developed a "suspender" design that allowed compact packaging of the heat exchanger and elimination of the steel cage. This work was carried out with support from the California Energy Commission, as publicly reported in 1999.

One example of this this type of spiral structure for a ground-based heat pump is described in U.S. Pat. No. 5,816,314 to Wiggs et al. which includes a hollow, rigid, cylindrical core or sleeve with a small diameter, helically wound supply tube and with an insulated fluid return line extending vertically up the central axis of that sleeve filled with insulating material. This entire unit is inserted into a hole with a fill that cures and hardens into a solid to increase thermal conductivity between the helical supply tube and the ground. In some embodiments, the supply and return tubes contain either a compressor lubricant oil or a refrigerant in addition to or instead of water, which this inventor believes is a very bad idea because of the potential risk of leakage and resulting environmental contamination if the tubing were to corrode (a deficiency already noted by Wiggs for prior systems). The hardened solid fill surrounding the tubing prevents any easy access for repair or replacement, should it become necessary.

U.S. Pat. No. 6,212,896 to Genung similarly describes a heat transfer column for geothermal heat that uses refrigerant lines that include copper tubing wound about a thin wall, vertically oriented tube. The unit fits within a surrounding flexible tube in the ground that is filled with a mixture of water and antifreeze that thermally communicates with the earth mass. While a solid block of fill is avoided, the potential for ground contamination by the water-antifreeze mixture or the refrigerant is still present.

The European patent application EP1992886A2 of Energy Resources srl precisely covers the concept of a compact spiral shaped geothermal heat exchanger like the 1997-1999 "suspender" design. The spiral units can be pre-assembled and easily transported to a site for insertion into the ground holes before backfilling with soil, sand, or concrete. The preassembly of the spiral units reduces construction and installation costs.

U.S. Pat. No. 9,157,666 to Freitag et al. describes ground heat exchange equipment providing a coaxial inner tube and outer liner with flows of water in the annulus between the two.

This inventor's work on the California "shallow-bore large diameter" ground helix was tabled in 2000 and resumed in 2012 in an improved version applied in a half-dozen successful projects by 2020. Despite its energy and maintainability advantages, the improved technology appears marginally competitive with low-cost air-coupled heat pumps in the coming era of zero-net energy, all-electric buildings. Also, costs are adversely affected by the three-step excavation process; first the augur, then manifold trench excavation, then backfilling of both the boreholes and the trenches. Compared to buried helical tubing, the water-filled bores disclosed here offer significant advantages, as described below. However, managing and maintaining desired water flow requires unique and specific strategies defined and described herein.

Vertical-helix ground exchangers are a cost-effective alternative to deep bores for geothermal heat pump applications, but remain marginally cost-effective compared to air-coupled heat pumps with added photo-voltaic capacity to offset lower air-coupled efficiency. Heat exchange is compromised by limited tubing surface area and thick polymeric tubing walls. In addition, typical buried-tubing configurations require considerable care to protect the tubing during installation; it is not generally practical to backfill with removed earth, as it does not compact well and can damage tubing arrays over time as it settles, so that carefully placed, graded sand must be used. Also, such installations do not provide post-installation access to the buried tubing for service or to adjust flow among parallel boreholes.

SUMMARY DISCLOSURE

This invention provides an economical ground heat exchanger system that uses water-filled membrane liners in cylindrical augured holes; and typically, with a submersible pump in a drain reservoir that is shared by multiple boreholes. Thermal connection with a building or industrial process occurs either through a heat exchanger in the reservoir, or through an external heat exchanger served by the reservoir pump. Such an external heat exchanger can be either a refrigerant-to-air or to-water element of a heat pump, or a direct water-to-water type, or a direct water-to-air type. The pump sends water, tempered either by an in-reservoir exchanger or an external heat exchanger, to the water-filled holes, where it exchanges heat with the ground before overflowing through gravity drain piping back to the reservoir for continued recirculation. Heat transfer with the ground occurs through thermal contact between the water, the membrane liners, and the earth supporting the liner(s). Optional raised borehole support rims maintain an "above grade" water level and allow removed soil to be re-used in a berm or planter over manifold pipes that connect the system components; thus eliminating the cost of trenching for the manifold pipes.

In one embodiment of the invention, a ground heat exchange system comprises (1) a reservoir containing water and a pump for the water, (2) a heat exchanger unit that is thermally coupled to an above-ground building, structure, or even an industrial load, any of which is to be thermally regulated, and that also is thermally coupled to the water in the reservoir, (3) a set of one or more substantially vertical boreholes in the ground, each borehole lined with a watertight membrane and filled with water, and (4) a water-circulating pipe system connecting the reservoir, the heat exchanger, and the boreholes. The pump circulates water from the reservoir through the heat exchanger, then to the boreholes, where the water overflows and then returns via gravity back to the reservoir. More specifically, the pipe system may have a (usually near grade-level) water inlet configuration that includes a discharge pipe supplying water pumped from the reservoir to a borehole "tree and branch" inlet manifold with feeder lines through a set of flow balancing valves in or into the boreholes. The pipe system also has a water overflow drain configuration that includes a set of drain ports at a top end of each borehole coupled to a gravity-fed drain manifold leading back through a final drain segment into the reservoir.

To maximize flow through the vertical borehole, the inlet and outlet are opposed; either flow through the balancing valves discharges through a downtube to the bottom, with overflow drainage out through an open top outlet pipe, or inlet flow enters the top water level, and an "up-pipe" causes overflow water to originate near the borehole bottom. In the latter option, a small hole is needed in the top of the drain outlet pipe to prevent a siphon from draining water below the level of the bottom of the outlet pipe.

This invention uses water-filled membrane liners in the augured holes instead of tubing and sand, soil, or concrete, to improve performance, reduce cost, and facilitate improved ongoing access to ground components. Water-filled bores offer improved performance compared to ground helical tubing designs, due to:
1. greater water-to-ground contact area
2. more thermal inertia (from the water) to buffer the heat pump cycles
3. reduced pressure drops and pumping energy
4. free-convective heat exchange from water to cylindrical earthen walls
5. more reliable flow balancing among the multiple boreholes.

This invention also offers cost reduction by:
1. eliminating the cost and labor associated with backfill
2. placing manifold pipes (that connect the multiple boreholes) at grade, without excavation, and using removed soil from the boreholes to fill over the manifolds to finish flush with the raised rims of the boreholes
3. using fewer boreholes for a given heat pump capacity.

This invention provides an improved, more versatile geothermal heat exchanger that can be installed more quickly and can better survive installation hazards. It uses a simple flow strategy in which a submersible pump in a reservoir below the water level of all boreholes sends water to the heat pump or direct heating or cooling mechanism, with return water distributed to the boreholes through accessible valves used to balance flow among the multiple boreholes that act in parallel. The overflow outlets from the individual boreholes can be set at different levels, but must all drain to the pump reservoir. Pumped flow into each borehole, through its balancing valve, causes it to overflow back to the pump reservoir, typically through a shared drain manifold below the level of the lowest borehole and above the level of the pump reservoir.

The system includes features that facilitate balanced flow among multiple boreholes, and optionally prevent vermin damage, including:
1. Molded top rings that hold the membrane liners and include:
   a. openings for supply and drain manifold pipe connections,
   b. adjustable feet for leveling.
2. Membrane liners that fit inside the top rings and fit tightly against the sides of the augured earth holes.
3. Weight-bearing insulated top covers that facilitate ongoing access, and clip or removably fasten to the top rings.
4. A submersible circulation pump in a reservoir below the level of water in the boreholes.
5. Manifold pipes that interconnect the water-filled boreholes with the circulation pump and the location of service (typically a building).
6. Optional vermin-protection cylinders that connect to the lower edge of the top rings.

DETAILED DESCRIPTION

Figure 1:
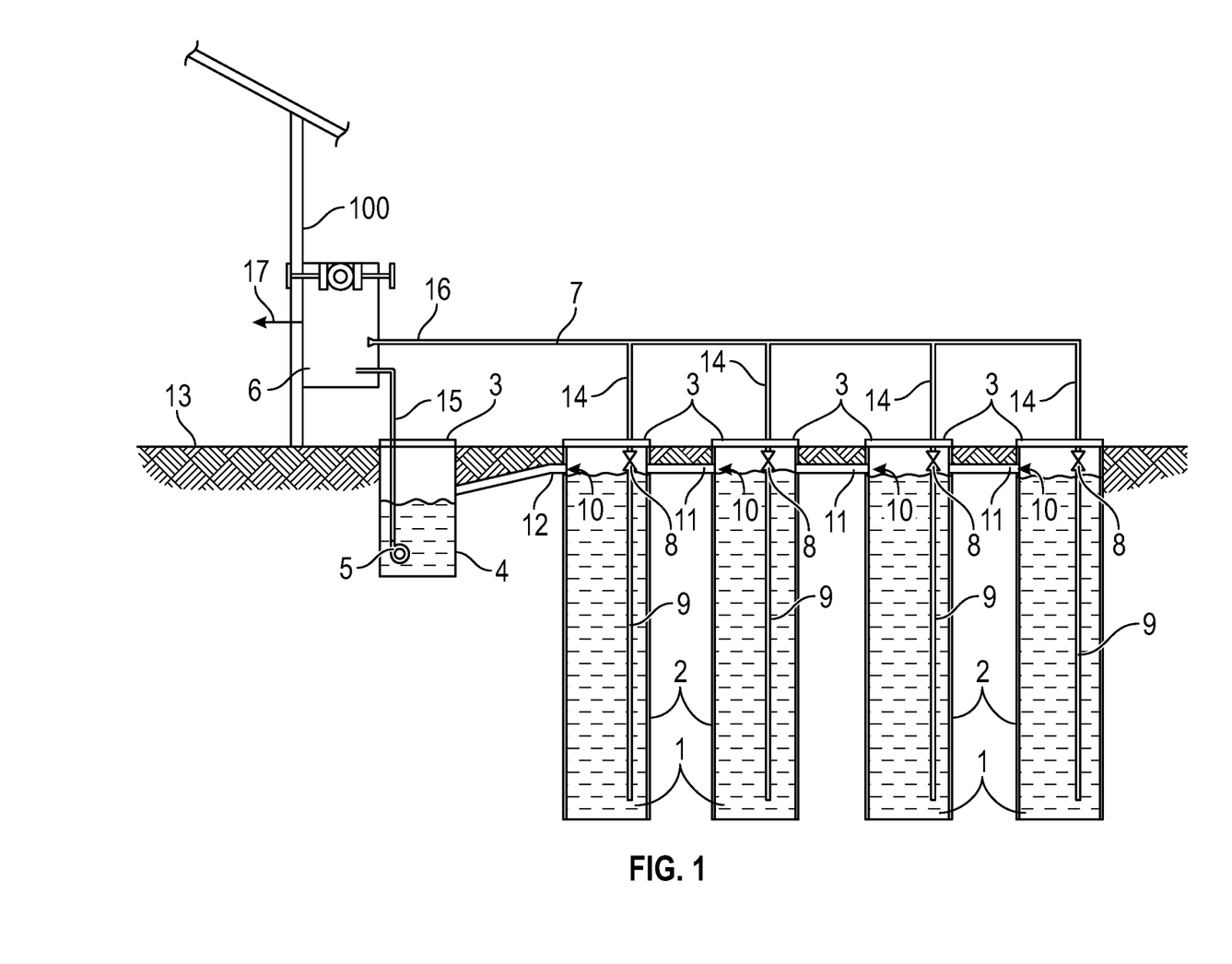
FIG. 1 is a schematic vertical sectional view of the major system components.

FIG. 1 shows a schematic vertical sectional view of the major system components when installed. A heat transfer device or heat exchanger 6 provides temperature regulation (heating and/or cooling) of usually above-ground structures 100 (or industrial processes) by way of secondary heat transfer pathways 17 associated with that heat exchanger 6. The heat transfer device 6 will typically be a reversible heat pump located inside a building, to prevent freezing of water-filled piping and heat exchangers. Typically, the heat pump can either (in winter) extract heat from its ground-side refrigerant-to-water heat exchanger, or reverse (in summer) to discharge heat to the ground. But there are also applications where the ground will be either cool enough or warm enough to directly cool or heat a building, particularly when connected to radiant comfort systems that can deliver comfort effectively from relatively temperate water. Direct heat transfer without a heat pump is also possible for some industrial processes.

Details of the heat exchanger are basically conventional and, except for a possible immersed version, are not discussed further. One example of this alternative embodiment would have a water-to-water heat pump located directly above the reservoir, with its "outdoor heat exchanger" immersed in the reservoir to reduce heat exchanger cost and facilitate combined product packaging. In this embodiment the reservoir might be located in a basement as part of an "appliance" that includes the reservoir, the heat pump, the "indoor pump", the borehole circulation pump, and controls.

For purposes of the present invention, water received through an input pipe 15 serves as a heat source/sink for use by the heat exchanger 6, after which the water exits through a discharge pipe 16. The ground in turn serves as an essentially constant temperature heat source/sink for the circulating water as it passes through a set of boreholes 1.

Parallel identical boreholes 1 in quantity dependent on overall system needs, hold water in cylindrical membrane liners 2. In a preferred configuration, the boreholes are 16 to 24" (40-60 cm) diameter and 15' (4.5 m) deep. Greater depth is avoided because the water pressure that increases with depth is more likely to cause leakage, and ground water authorities are more likely to treat the excavations as though they were water wells for which more expensive approvals are required. Greater diameters increase the challenges and costs of spanning across the top of the water-filled borehole. Each watertight membrane or liner 2 may comprise a flexible, cylindrical, extruded polyethylene tube with a watertight bottom seam. Alternatively, it may be a flexible tube manufactured from a membrane sheet with a vertical, full-height, watertight side seam and a watertight bottom seam.

A shallower sunken container or reservoir 4 houses a submersed pump 5 that delivers water from the reservoir 4 out through a pipe 15 to the heat transfer device 6, which heats or cools the flow stream and discharges it back through its discharge pipe 16 into a manifold pipe 7 that delivers water into the individual boreholes 1 through the parallel feeder lines 14. Once through the insulated borehole covers 3, the water streams through flow balancing valves 8 and then, in the embodiment shown in FIG. 1, through the down-tubes 9 to enter the water-filled boreholes 1 near their bottoms.

As water enters the boreholes 1, it causes their water levels 28 to rise until they overflow through their drain ports 10 into the drain manifold 11, from which the overflow water flows on into the final drain segment 12 that drains back into the pump reservoir 4. Once the water level 28 in each borehole 1 has reached the level of the drain ports 10, the water level should remain essentially constant, and flows are driven by the pumping of water into the boreholes 1 through the down-tubes 9. One possible accessory to the pump container 4 is a float-type automatic water refill (not shown) to compensate for any water loss that might occur due to evaporation and/or possible moisture loss through the membrane walls. In an alternate embodiment, the vertical tube is part of the outlet drainage system, and it turns horizontal at the top to exit through the borehole wall. In this alternative, a small hole is needed on the top of the exit pipe, inside the borehole, to break a siphon that might "overdrain" a borehole at higher elevation than others. Note that while FIG. 1 shows some boreholes draining out through the others, FIG. 2 more accurately shows each borehole outlet with its own drainage path into a shared return manifold.

Regarding the submersed pump 5, for larger systems (bigger than the single-family home, say, for apartments), pool pumps that can self-prime when above water level are a good alternative. In that case, the pump 5 need not be submersed within the reservoir 4, but can simply draw water out of the reservoir 4 for discharge into the heat exchanger's input pipe 15.

Figure 2:
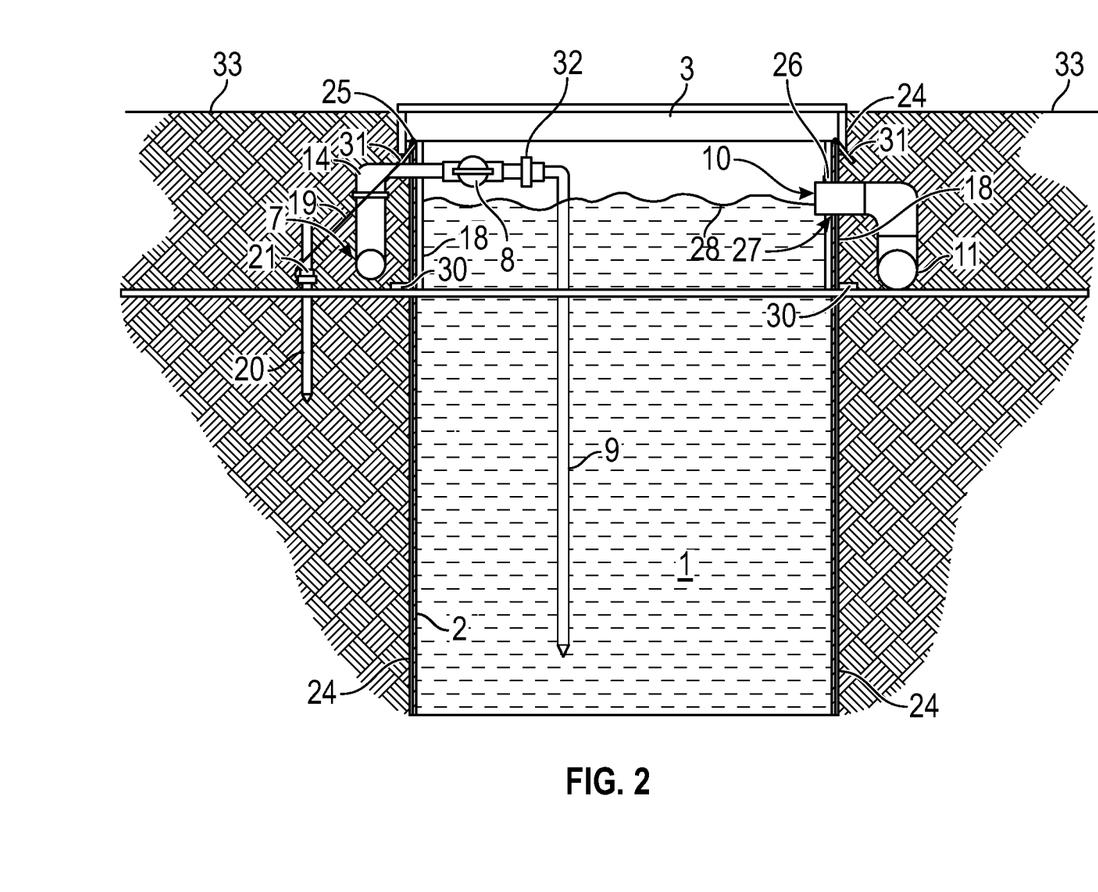
FIG. 2 is a vertical sectional view of the top of an individual borehole.

FIG. 2 shows a cut sectional view of the top portion of a borehole 1, with the membrane liner 2 supported by the earth walls 24 of the augured borehole 1. This finer detail allows labeling of a polymeric rigid top ring 18 that supports the liner 2 where it extends above the ground 13. Also shown here is how the top edge of the liner 2 wraps over and down the outside of a top edge 25 of the top ring 18. At this "top wrap", the liner 2 may be secured to the top ring 18 using either adhesive, a series of clips, or with an outside ring or clamps screwed through into the top edge of the top ring 18. Clipping onto the top edge 25 of the top ring 18 is the insulated polymeric borehole cover or lid 3. Integral circumferential stiffening flanges 31 at the top edge 25 of the top ring 18 and stiffening flanges 30 at the bottom of the top ring 18 (at the original ground level 13), also serve to hold the rigid top ring 18 in its final level position as described with respect to FIG. 3.

FIG. 2 also shows the piping connections. The horizontal manifold pipe 7 delivers water into a feeder pipe 14 that penetrates the rigid top ring 18 and the membrane liner 2 to enter the top of the borehole 1. The feeder pipe 14 leads to the flow balancing valve 8 and the joint or union 32 before turning 90 degrees into the vertical downtube 9. The valves 8 facilitate flow balancing; with the union 32 apart, an installer can use a hand-held measuring container sequentially on all boreholes 1, adjusting valves 8 as necessary based on measured flows of water passing from the feeder pipes 14. The piping also includes the drain port 10 that penetrates through an undersized hole 26 that is punched into the membrane liner 2, then stretched around the cylindrical exit port 10 and secured either with a polymeric solvent or with a worm drive clamp 27. The penetrations through the membrane liner 2 by the feeder pipe 14 may be sealed in the same way as that for the drain port 10. Note that, as shown, the water level 28 is at a height to drain out through drain port 10 and downward to flow back through the drain manifold 11 toward the reservoir 4 that was shown in FIG. 1.

The horizontal piping provided by the manifold 7 to the parallel feeder lines 14, and by the drain manifold 11 to the final drain segment 12, could be located at or near grade-level. Alternatively, supply and drain manifolds pipes could instead be in shallow backfilled trenches, possibly with earth-supporting covers over the boreholes 1 (since their water levels would be below-grade in that case). The main thing is that these lines be relatively easy to access for maintenance and repair in the event of leaks, but otherwise out of the way. The drain manifold 11 and the final drain segment 12 provide gravity feed of water overflow from the boreholes 1 back to the reservoir 4 and thus are sloped generally downwards toward the reservoir 4.

FIG. 2 still further shows in elevation view an outrigger rib pair of triangular support legs 19 used to level the top ring 18. This feature will be further discussed with respect to FIG. 3, but in this view shows a threaded stake 20 pounded into the earth 13, with shims 29 and nuts 21 that facilitate vertical adjustment of the top ring 18. Though only one such outrigger can be seen here, there are three or four outriggers positioned at either 120° (if 3) or 90° (if 4) around the circumference of the top ring 18.

In a preferred embodiment the lid 3 and upper edge of the top ring 18 finish at least 8" above the original grade. The soil removed by the augur to form the boreholes can then be used to create a raised berm or walled planter bed with a final grade level 33 around the top rings 18 of the boreholes 1, which, for best performance and maximum thermal access to the ground's available thermal mass, are oriented in one or two long rows for a typical residential project. With 18" (45 cm) diameter boreholes 15' (4.5 m) deep, spaced 8' (2.4 m) apart, the removed soil can create a continuous planter 10" (25 cm) deep by 48" (1.2 m) wide atop the original grade 13. This strategy facilitates placement of the supply and drain manifold pipes 7 and 11 at existing grade 13, eliminating the need for manifold trenches. It also minimizes post-auguring dirt movement, as the removed soil is used very near its original removal point. The new final grade 33 around the boreholes 1 is labeled on FIG. 2.

For larger or industrial projects, the boreholes may be arranged in grids, but may not in these cases typically be expressed as raised features. Such borehole arrays may even be placed under concrete slabs in basements or parking garages, with strong removable covers that can support vehicular traffic.

Figure 3:
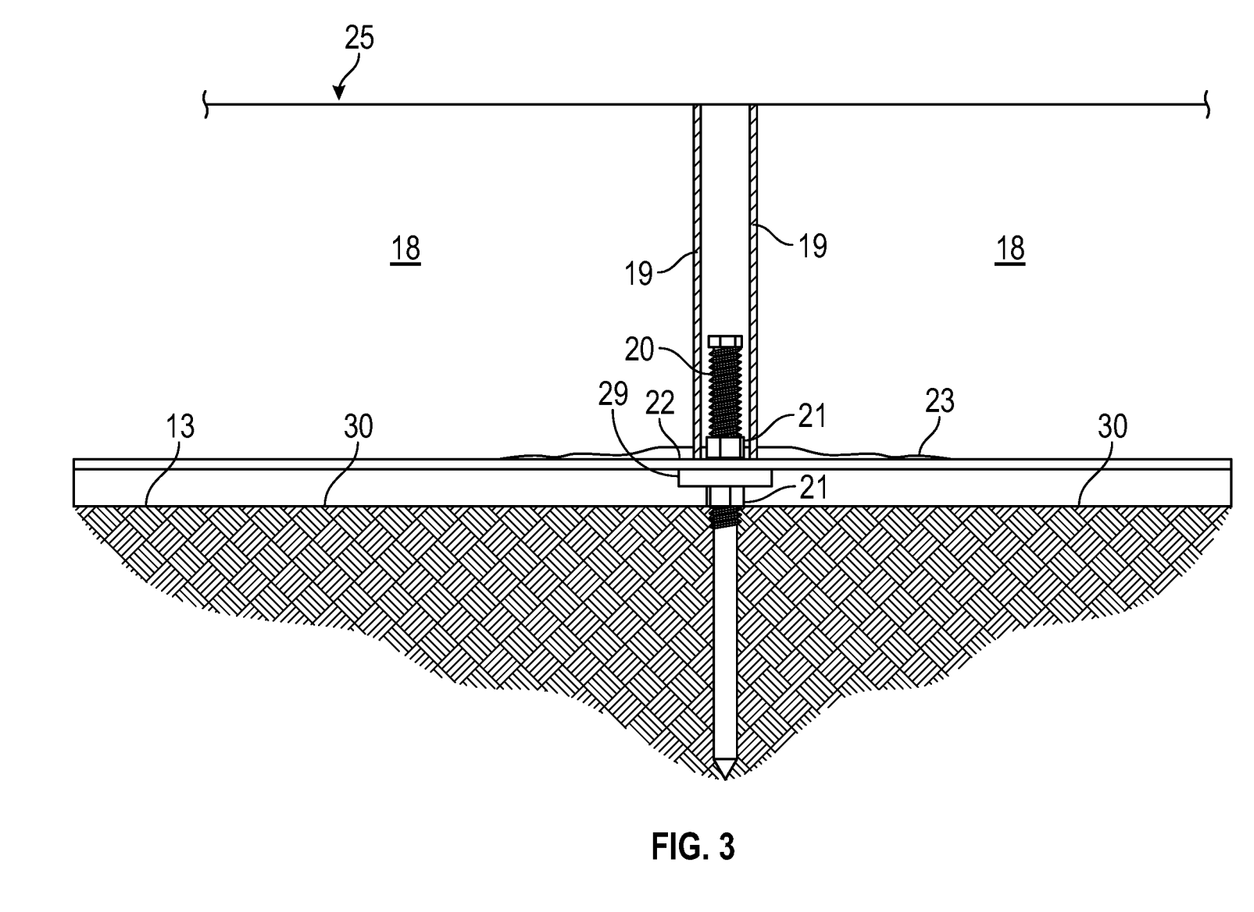
FIG. 3 is a close-up vertical sectional view of the top ring's adjustable support design.
Figure 4:
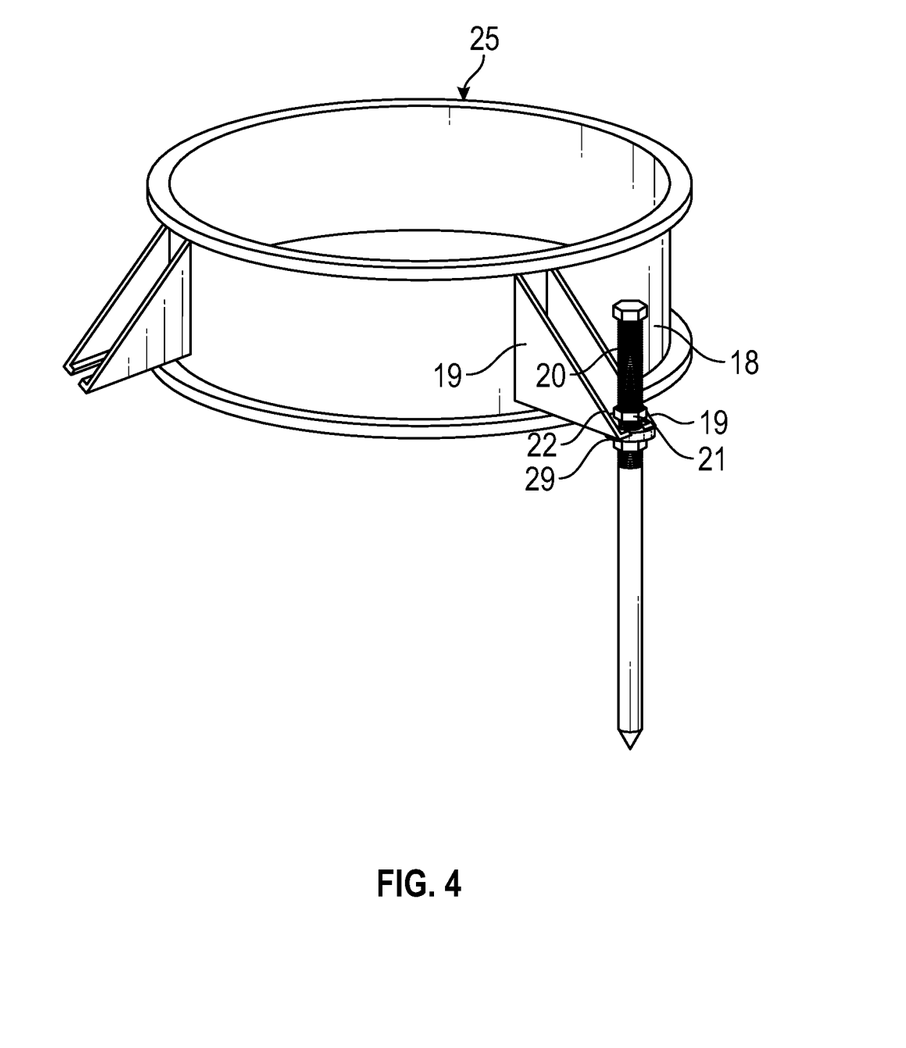
FIG. 4 is an isometric view of the top ring of FIG. 3 shown in isolation from the ground, with three pairs of triangular support legs (one of which is not visible in this view) and with a stake affixed to one of the pairs of support legs for illustration (normally, stakes would be affixed to each of the three pairs of support legs after the ring has been placed onto the ground above a borehole).

FIG. 3 is a close-up vertical section view of the top ring 18's adjustable support design, looking "face-on" at a pair of triangular outrigger support legs 19 (found at each of three, usually equidistant, circumferential locations). This view shows the integral horizontal plate 22 that joins the pair of legs 19, through which the threaded stake 20 penetrates before entering the earth 13. The top ring 18 (seen by itself in isometric view in FIG. 4, with one of the stakes affixed to one pair of legs of the ring for illustration purposes) is initially leveled and supported using variable thickness shims 29 under these three horizontal plates 22; the shims 29 can be slotted to fit around the stakes 20. After the ring 18 is leveled, nuts 21 are screwed tight upward and downward against the plate 22 to hold the top ring 18 firmly and level at its support points. Cement globs 23 are then placed around (both above and below) the support points, and over the nearby portions of the lower ring stiffening flange 30, to provide permanent ring support. After the cement globs 23 have hardened, the stakes 20 can be removed for reuse.

What is claimed is:

1. A ground heat exchange system, comprising:
   a reservoir containing water and a submersible pump for the water;
   a heat exchanger unit thermally coupled to a building or industrial load to be thermally modified, and thermally coupled to the water in the reservoir;
   a plurality of substantially vertical boreholes in the ground, each borehole lined with a watertight membrane and filled with water, the reservoir having a shallower depth than any of the boreholes and the submersible pump being submerged below a water level of the boreholes;
   a water-circulating pipe system supplying water pumped by the submersible pump from the reservoir through a water inlet manifold to a set of adjustable balancing valves, one valve per borehole, for balancing flow among the plurality of boreholes, wherein each borehole also includes a water overflow drain coupled to an external gravity-fed drain manifold leading overflow water from the boreholes back into the reservoir;
   wherein a top portion of each borehole has a thickened top ring through which a feeder line and a drain port respectively pass into and out of the borehole, and into which a watertight membrane is secured; and
   wherein each of the top rings has at least three outward-directed legs for ring support and leveling.

2. The ground heat exchange system as in claim 1, wherein closely-spaced leg pairs are joined at their lower edges with integral horizontal plates with outward-oriented slots that interact with support stakes.

3. The ground heat exchange system as in claim 2, wherein the stakes have threaded top portions, and where pairs of opposed nuts on the threads compress on and hold the plates, to allow height adjustment for leveling.

4. The ground heat exchange system as in claim 2, wherein the stakes are removable for reuse after the top ring is permanently supported in a level position.

5. The ground heat exchange system as in claim 4, wherein the plates are partially fixed in concrete to provide permanent level support.

6. The ground heat exchange system as in claim 1, wherein for each top ring an insulated top cover interlocks with the top ring.

7. A ground heat exchange system, comprising:
   a reservoir containing water and a submersible pump for the water;
   a heat exchanger unit thermally coupled to a building or industrial load to be thermally modified, and thermally coupled to the water in the reservoir;
   a plurality of substantially vertical boreholes in the ground, each borehole lined with a watertight membrane and filled with water, the reservoir having a, shallower depth than any of the boreholes and the submersible pump being submerged below a water level of the boreholes;
   a water-circulating pipe system supplying water pumped by the submersible pump from the reservoir through a water inlet manifold to a set of adjustable balancing valves, one valve per borehole, for balancing flow among the plurality of boreholes, wherein each borehole also includes a water overflow drain coupled to an external gravity-fed drain manifold leading overflow water from the boreholes back into the reservoir; and
   wherein outer ends from a drain port of each borehole flow downward into a drain manifold that drains all water overflowing from the borehole by gravity into the reservoir.

8. A ground heat exchange system, comprising:
   a reservoir containing water and a submersible pump for the water;
   a heat exchanger unit thermally coupled to a building or industrial load to be thermally modified, and thermally coupled to the water in the reservoir;
   a plurality of substantially vertical boreholes in the ground, each borehole lined with a watertight membrane and filled with water, the reservoir having shallower depth than any of the boreholes and the submersible pump being submerged below a water level of the boreholes;
   a water-circulating nine system supplying water pumped by the submersible pump from the reservoir through a water inlet manifold to a set of adjustable balancing valves, one valve per borehole, for balancing flow among the plurality of boreholes, wherein each borehole also includes a water overflow drain coupled to an external gravity-fed drain manifold leading overflow water from the boreholes back into the reservoir;
   wherein the reservoir and each of the boreholes have removable lids at ground level; and
   wherein each balancing valve is located below the removable lid and discharges water through a downtube extending nearly to the bottom of the borehole, and where a piping union adjacent and downstream of the valve allows temporary disconnection from the downtube for manual adjustment of the water flow rate into the borehole.

9. A ground heat exchange system, comprising:

a reservoir containing water and a submersible pump for the water;

a heat exchanger unit thermally coupled to a building or industrial load to be thermally modified, and thermally coupled to the water in the reservoir;

a plurality of substantially vertical boreholes in the ground, each borehole lined with a watertight membrane and filled with water, the reservoir having a shallower depth than any of the boreholes and the submersible pump being submerged below a water level of the boreholes;

a water-circulating pipe system supplying water pumped by the submersible pump from the reservoir through a water inlet manifold to a set of adjustable balancing valves, one valve per borehole, for balancing flow among the plurality of boreholes, wherein each borehole also includes a water overflow drain coupled to an external gravity-fed drain manifold leading overflow water from the boreholes back into the reservoir;

wherein the reservoir and each of the boreholes have removable lids at ground level; and wherein each balancing valve is located below the removable lid and discharges water directly into the top of the borehole, and wherein a discharge water outlet tube elbows downward and extends nearly to the bottom of the borehole, and wherein the top of the outlet tube, before passing out through the wall of the borehole, includes a small hole designed to break a siphon so that the water level cannot fall below the level of the bottom of the drain opening through the borehole wall.

* * * * *